March 23, 1926.

O. B. SCHELLBERG 1,577,876

MEDICAL APPARATUS FOR USE IN PROCTOTHERAPY

Filed May 16, 1925 2 Sheets-Sheet 1

INVENTOR
Oscar Boto Schellberg.
BY
ATTORNEY

March 23, 1926. 1,577,876
O. B. SCHELLBERG
MEDICAL APPARATUS FOR USE IN PROCTOTHERAPY
Filed May 16, 1925 2 Sheets-Sheet 2
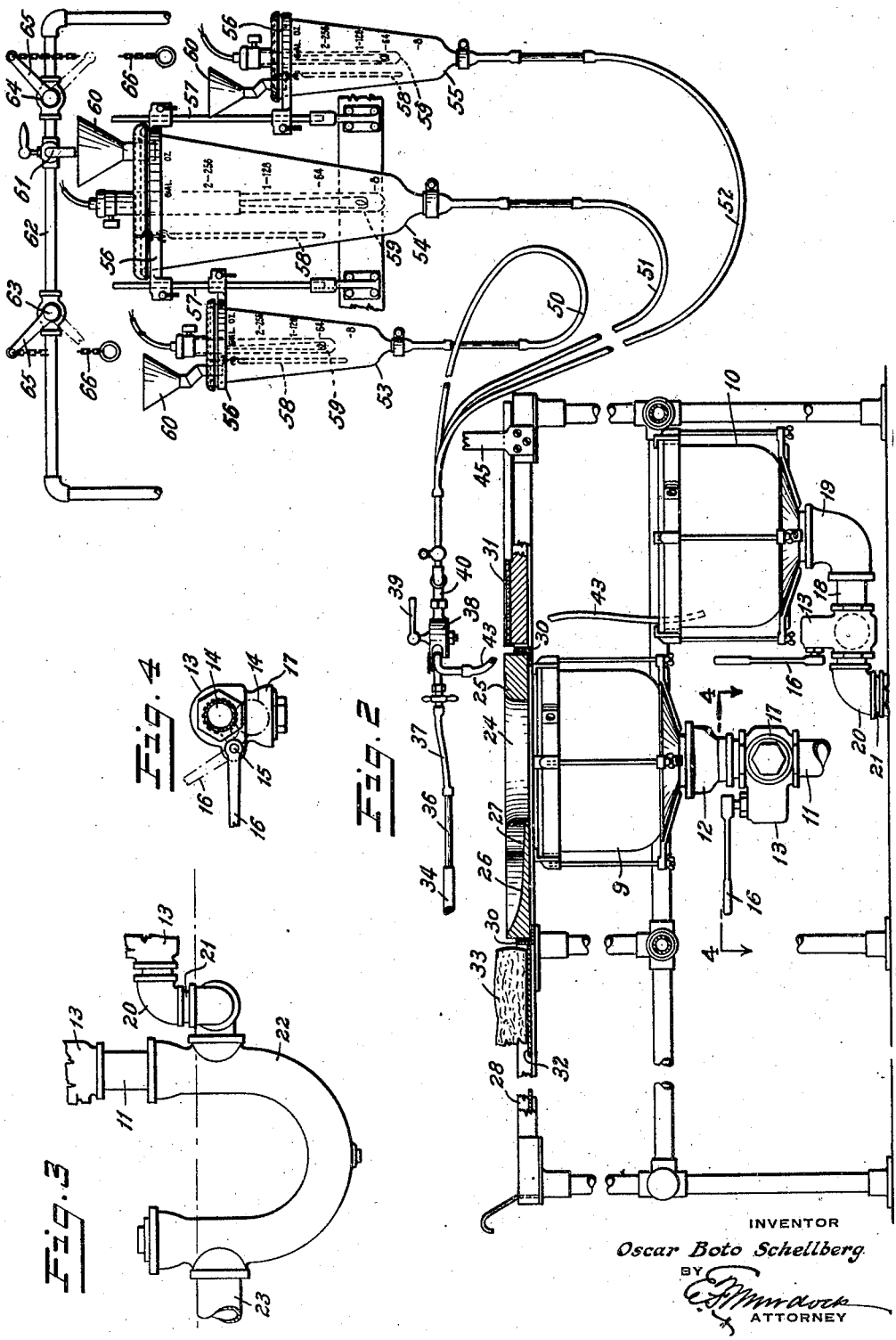
INVENTOR
Oscar Boto Schellberg
BY
ATTORNEY Patented Mar. 23, 1926.

1,577,876

UNITED STATES PATENT OFFICE.

OSCAR BOTO SCHELLBERG, OF NEW YORK, N. Y.

MEDICAL APPARATUS FOR USE IN PROCTOTHERAPY.

Application filed May 16, 1925. Serial No. 30,660.

*To all whom it may concern:*

Be it known that I, OSCAR BOTO SCHELL-BERG, a citizen of the United States, and a resident of the city of New York, in the county and State of New York, have invented a new and Improved Medical Apparatus for Use in Proctotherapy, of which the following is a full, clear, and exact description.

Among the principal objects which the present invention has in view are: in providing means for segregating the body evacuations during the treatment; to provide facilities for easily accomplishing the above stated purpose; to carry the irrigation fluid and medicated liquids in clear view; to provide means for at all times indicating the temperature of all of said liquids; to provide means for varying the temperature of the fluid and liquids; to provide means for readily varying the water head of the fluid and liquids; and to provide for the easy and quick disposal of the evacuations.

Drawings.

Figure 2 is an elevation of the same partly in section;

Figure 3 is a detail view of a section of the sewer connection with which the apparatus is provided;

Figure 4 is a detail view of the waste pipe connection of one of the evacuation basins, the section being taken as on the line 4—4 through the tube.

Figure 1:
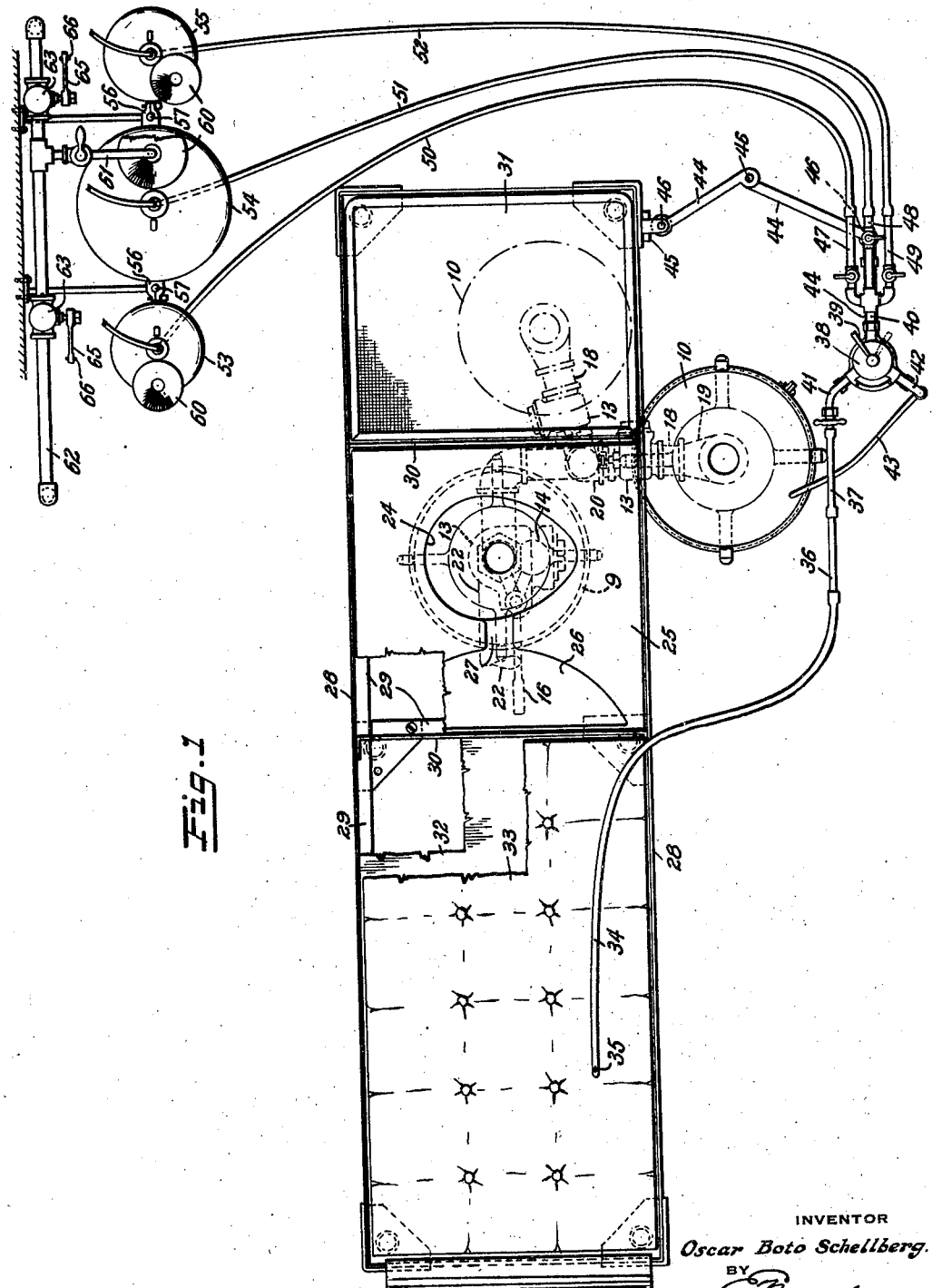
Figure 1 is a top plan view of an apparatus constructed and arranged in accordance with the present invention.

As seen in the drawings the apparatus is provided with two evacuation basins 9 and 10. The basin 9 is preferably mounted permanently and stationarily at the upper end of the waste pipe 11, the pipe being provided with a bell-shaped end 12 to receive the neck of the receptacle. A valve structure 13 is interposed between the bell-shaped end 12 and the pipe 11. Within the structure is a gate 14, best shown in Figure 4 of the drawings. The gate 14 swings on a pivot 15 to and from the lower end of the bell-shaped end 12, to close the same tightly when in position. To this end a handle 16 is provided. An offset portion 17 houses the gate 14 when thrown to the open position.

The basin 10 is mounted on a horizontally disposed pipe section 18, and is set in the bell-shaped end 19 thereof. An elbow 20 is pivotally mounted on a nipple 21 which is in open communication with a trap 22. The pipe 11 also opens into the trap 22. As shown in Figure 3 of the drawings, the trap 22 is directly connected with the sewer 23. It will be noted that the pipe 18 is provided with a valve housing 13 the construction and arrangement thereof and the parts associated therewith being in all respects the same as described above.

By means of the arrangement above described it is obvious that the operator may empty either of the receptacles 9 or 10 by moving the handle 16 as and when desired.

The receptacle 9 is placed beneath the opening 24, which is convenient to the person of the patient being treated. The opening 24 is preferably shaped in a panel 25. The panel 25 is preferably constructed of wood and has an inclined drain board 26 from which leads a channel 27. The panel 25 rests within the separate frame 28, and upon the flanges 29 thereof. The frame 28 extends lengthwise of the apparatus and is constructed of angle metal which is divided crosswise by the braces 30. The braces 30 thus are arranged to form three panels within the frame 28. In one of the panels thus formed is a slab 31 removably supported in the frame 28. At the opposite end of the frame 28 a sheet of metal 32 is removably supported on the flanges 29 of the frame. The sheet of metal 32 forms a support for a mattress 33, on which the patient is disposed when being treated.

The apparatus for treating the patient consists primarily in a flexible delivery tube 34, adjacent the end whereof are openings 35, the construction and arrangement whereof are best to be seen in Letters Patent No. 1,425,420, dated August 8, 1922. This tube is connected by a series of rigid members, such as the glass tube 36 and the rubber connection 37, to the valve housing 38. The valve housing 38 contains a two-way rotary valve having a handle 39 adapted for movement to connect the passages in the valve successively with the intake pipe 40 and the delivery pipes 41 and 42. The pipe 42 is connected with the tube 43 while the pipe 41 delivers to the tube 34.

The housing 38 and the intake pipe 40 are supported on an articulated bracket 44, the upright 45 whereof is secured to the frame 28 as can be seen in Figure 2 of the drawings. The bracket 44 may be swung around the pivots 46 to place the valve housing 38 in any convenient location. The intake pipe 40 is in open communication with the tubes 47, 48 and 49. Each of the tubes 47, 48 and 49 has a control valve, and is connected by means of the flexible tubes 50, 51 and 52 with containers 53, 54 and 55. The said containers are graduated as illustrated and are each supported by bracket rings 56. The bracket rings 56 are slidably mounted on upright rods 57, each ring having a clamp collar for fastening the bracket immovably upon its rod or rods. By loosening the clamp collar and moving the rings up and down the liquid head or fall of the liquid contained in the containers may be varied to suit the wishes of the operator.

The containers 54 and 55 have each a cover which cover supports a thermometer 58 and an electric lamp 59. The lamp 59 serves the double purpose of illuminating the liquid in the container and the thermometer therein. Each container has a receiving funnel. The funnel connected with the container 54 is disposed in line with the spigot 61, which is located on the pipe 62 between the valves 63 and 64. The valves 63 and 64 are spring closed valves, and are provided with arms 65 to which pull chains 66 are attached. The valves 63 and 64 control the flow of cold and hot water to the pipe 62 and spigot 61. During an operating period the spigot 61 normally is constantly open, and in the non-operating periods the spigot is closed.

By this arrangement the operator can readily vary the heat of the contents of the container 54, which is the liquid generally used for irrigation and cleansing.

The basins 9 and 10 are generally used for catching different stages or portions of the evacuation. During the first part of the treatment, when the passages are being irrigated, the tube 43 is placed in the opening 24 to drain into the basin 9. After the passages have been properly cleansed the basin 10 is drawn under the frame to the position substantially shown in full lines in Figure 1 of the drawings and the tube 43 is placed therein. It will be understood that the treatment as administered provides for first using the contents of the container 54 for irrigating, the valve for controlling the flow from the tube 51 being open, and the valve in the housing 38 being turned to permit of the flow from the valve into the tube 34. As disclosed in the above mentioned patent, the valve in the housing 38 is operated to open communication from the intake pipe 40 to the tube 34, and from the tube 34 to the tube 43, thereby providing for the introduction of the liquid by means of the tube 34, and for the withdrawal of the liquid therefrom.

Suitable medicaments are carried in the containers 53 and 55, which are in turn introduced through the tube 34 by manipulation of the valve 38 and withdrawn therefrom, in part or wholly, through the tube 43 to be caught in the basin 10. In this manner the evacuations may be separately examined or specimens may be taken therefrom.

The lamps 59 are used in part for heating. When the heat in the containers 53 and 55 becomes excessive the current is turned off in the lamps and the contents allowed to cool.

*Claims.*

1. A proctotherapeutic apparatus comprising a patient receiving table having an apertured top, a receiving basin supported beneath the aperture, said basin having a fixed permanent sewer connection, a second receiving basin supported under said table, a sewer connection comprising a pivot for swinging said second basin from under said table to a lateral position at one side thereof, and valve controlled means for intestinal irrigation, said means being adapted for discharge into either of said basins.

2. In a proctotherapeutic apparatus, a patient receiving table having an apertured top, a fixed receiving basin disposed beneath the aperture, a valved sewer connection from said fixed basin, a movable receiving basin disposed beneath said table, a valved sewer connection from said movable basin, said last named sewer connection being arranged horizontally, pivoting said movable basin whereby said basin may be swung laterally outward from the table, means associated with said table for intestinal irrigation and treatment, and a valve controlled discharge tube connected with said means for selective intestinal evacuation into either of said basins.

OSCAR BOTO SCHELLBERG.